G. M. MILLS.
Manufacture of Candy Whistles.

No. 229,163.　　　　　　Patented June 22, 1880.

WITNESSES:
Saml. J. Van Staveren
A. Connolly

INVENTOR,
George M. Mills,
By Connolly Bros.,
ATTORNEYS

UNITED STATES PATENT OFFICE.

GEORGE M. MILLS, OF PHILADELPHIA, PENNSYLVANIA.

MANUFACTURE OF CANDY WHISTLES.

SPECIFICATION forming part of Letters Patent No. 229,163, dated June 22, 1880.

Application filed October 4, 1879.

*To all whom it may concern:*

Be it known that I, GEORGE M. MILLS, of Philadelphia, in the county of Philadelphia and State of Pennsylvania, have invented certain new and useful Improvements in Manufacturing Candy Whistles; and I do hereby declare the following to be a full, clear, and exact description of the invention, such as will enable others skilled in the art to which it pertains to make and use it, reference being had to the accompanying drawings, which form part of this specification, in which—

Figure 1:
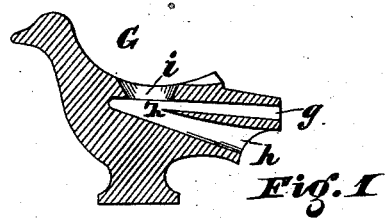
Figure 2:
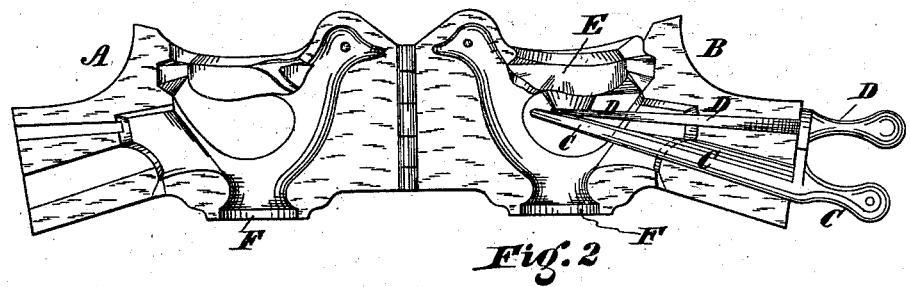
Figure 3:
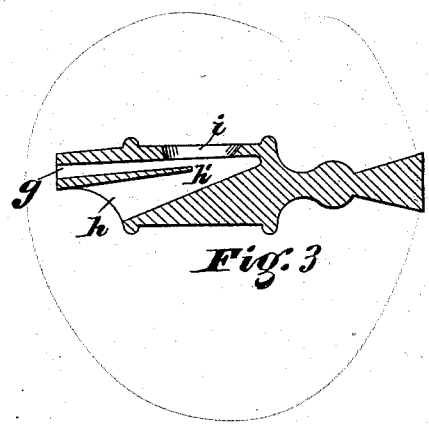
Figure 4:
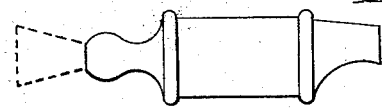
Figure 5:
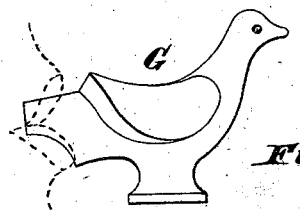

Figures 1 and 3 are longitudinal vertical sections of whistles manufactured in accordance with my invention. Fig. 2 is a plan of the opened mold, and Figs. 4 and 5 are side elevations of said whistles.

My invention has for its ultimate object to insure accuracy and certainty in the manufacture of candy whistles, whereby a perfect and effective whistle may be produced at every operation of the mold, thereby obviating the defects and preventing the waste of material and of labor heretofore encountered, resulting from the imperfection of the method and means hitherto employed.

My invention consists, primarily, in the peculiar construction of the mold employed in the manufacture, such mold consisting of a two-part body with two converging cores and a stud-piece, and, secondarily, in the peculiar construction of the whistle produced in such mold, such whistle having two converging passages, one of which becomes closed when the whistle is applied to the lips and forms an air-chamber.

Referring to the accompanying drawings, A and B indicate the two parts of a mold, the recesses in which may be of any appropriate form or design, and which, in the drawings, are made in the configuration of a bird. C and D are cores which rest in channels in the parts A and B, and which converge, as shown, meeting at their inner ends, so that the material cast around them will have a hollow chamber at their place of convergence.

E is a stud-piece fitted to the sections A B, the object of this piece, which forms a core, removable when the mold is parted, being to produce in the article molded a passage-way communicating with the chamber formed by the ends of the cores C D.

F represents the ingate through which the material is poured into the mold. This ingate, in said Fig. 2, is shown as directly opposite the stud-piece E, and therefore on the side or in the edge of the mold; but it may be, and in molds having other designs than that shown in said Fig. 2, is in the end of said mold.

In Figs. 1 and 5 is shown the whistle G, obtained from the mold described. Said whistle is in the form of a bird, having two passages, $g\,h$, which converge at the point $h'$, above which is an opening, $i$.

The passage $g$ is that through which the air is blown into the whistle, the opening $i$ being that through which the air emerges therefrom. The passage $h$ is closed by the lower lip of the person whistling, as indicated by dotted lines in Fig. 5, said passage thus forming the air-chamber.

Fig. 4 shows a whistle cast in a mold constructed on same principle as that shown in Fig. 2, the design being varied and the ingate being at the end instead of in the side of mold, the material which fills said ingate in filling being represented in dotted lines. In the other design such material forms the counterpart of the foot of the bird or the pedestal of the figure.

Molds constructed as above may be used for casting whistles of other materials than candy, though especially designed and adapted for the latter-named article.

What I claim as my invention is—

1. The mold herein described, for casting candy and other whistles, having the two converging cores C D and stud-piece E, substantially as shown and described.

2. A whistle having two converging passages, $g\,h$, and an opening, $i$, leading from the place of convergence, one of said passages forming an inlet for the admission of air and the other an air-chamber which is adapted to be closed by the lip when applied to the mouth, substantially as shown and described.

In testimony that I claim the foregoing I have hereunto set my hand this 26th day of September, 1879.

GEORGE M. MILLS.

Witnesses:
   WM. M. MCKNIGHT,
   SAML. J. VAN STAVOREN.